United States Patent [19]

D'Amico

[11] 4,126,926

[45] Nov. 28, 1978

[54] METHOD OF CONSTRUCTING A METAL PANELED FENCE

[76] Inventor: Anthony J. D'Amico, 10390 NW. 36th St., Coral Springs, Fla. 33065

[21] Appl. No.: 737,281

[22] Filed: Nov. 1, 1976

Related U.S. Application Data

[63] Continuation of Ser. No. 503,339, Sep. 5, 1974, abandoned.

[51] Int. Cl.² .................................................. B23P 11/02
[52] U.S. Cl. ........................................ 29/446; 256/21; 256/24; 256/73
[58] Field of Search .................... 29/446; 256/21, 19, 256/37, 24, 73

[56] References Cited

U.S. PATENT DOCUMENTS

| | | | |
|---|---|---|---|
| 2,890,023 | 6/1959 | Baxter et al. | 256/19 |
| 3,050,287 | 8/1962 | Bloch et al. | 256/19 X |
| 3,120,376 | 2/1964 | Case | 256/24 |
| 3,122,355 | 2/1964 | Richardson | 256/21 X |
| 3,197,852 | 8/1965 | Johnson | 29/446 |
| 3,385,566 | 5/1968 | Dwyer | 256/19 |
| 3,652,060 | 3/1972 | Glover | 256/24 X |
| 3,799,506 | 3/1974 | Schwartz | 256/37 X |

Primary Examiner—Charlie T. Moon
Attorney, Agent, or Firm—Malin & Haley

[57] ABSTRACT

A lightweight aluminum paneled fence and the method of its construction comprising a plurality of thin aluminum panels fastened to fixed terminal posts with adjacent panels being disposed on opposite sides of said posts, said panels being properly tensioned by a plurality of floating tensioning bars, said tensioning bars having a rectangular or elongated cross-section which is interwoven between adjacent panels after they are rigidly fixed to the terminal and line posts and rotated from the narrower width to the longer width, thus providing tensioning to firmly and rigidly hold the panels in position. The fence may be constructed on site using continuous flexible aluminum panels, each panel being cut to the particular length of the fence desired, there being no need to construct the fence in relatively short segmentized panels. The tensioning bar also provides for adjacent panel separation to allow air flow through the fence.

1 Claim, 6 Drawing Figures

U.S. Patent  Nov. 28, 1978  4,126,926
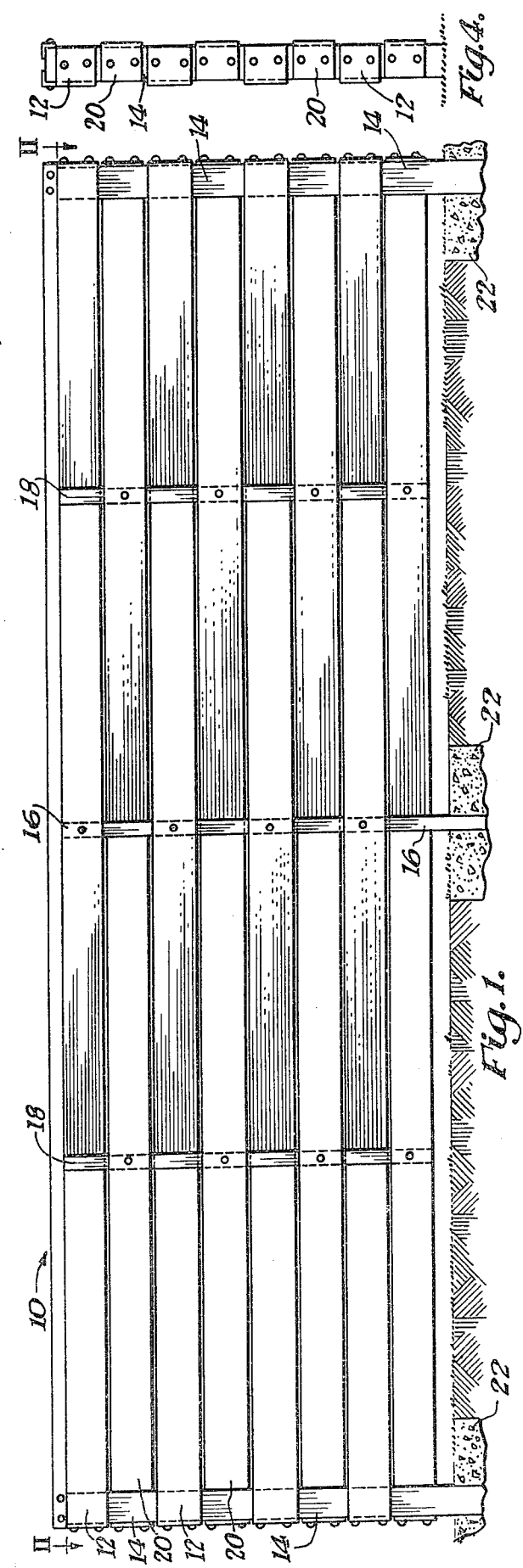
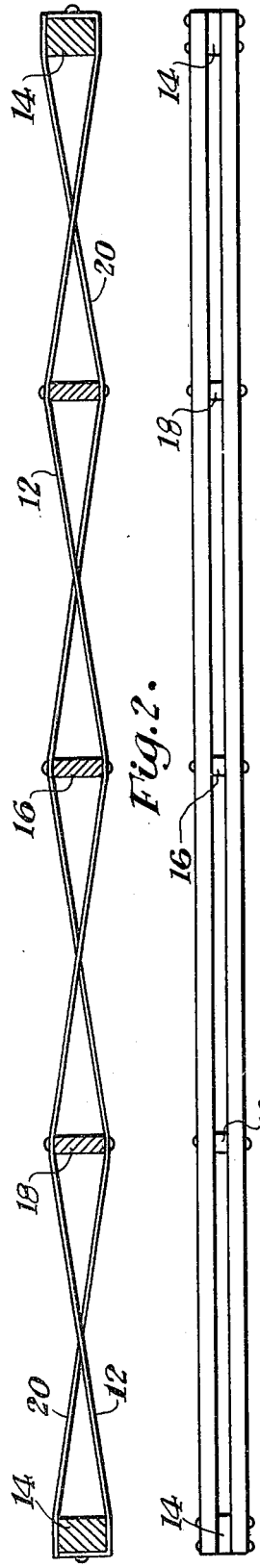
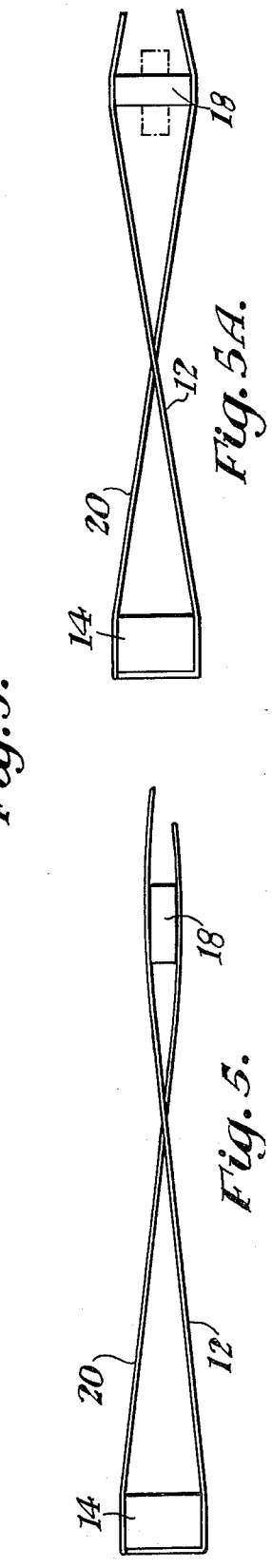

METHOD OF CONSTRUCTING A METAL PANELED FENCE

This is a continuation of application Ser. No. 503,339, filed Sept. 5, 1974 now abandoned.

BACKGROUND OF THE INVENTION

This invention relates generally to a lightweight, easily constructed fence or closure device which utilizes continuous aluminum panels stretched between terminal and line posts and specifically relates to an improved lightweight aluminum paneled fence having a plurality of "floating" posts vertically interwoven between adjacent panels which act to insure proper tensioning of the flexible panels.

In the past, several attempts have been made to construct a fence using thin, elongated sheets of metal, such as aluminum, as the barrier means. One of the major advantages of such a fence is that if anodized or enamelized, the fence is virtually maintenance free. One of the major problems in constructing such a fence has been the inability to properly tension the metal panels. Because of improper tensioning oftentimes the panels will sag also reducing the overall rigidity of the structure. Thus, the stretching and fastening of each panel (which could only be in short lengths) was extremely time consuming, greatly increasing the cost of the fence.

The instant invention overcomes these problems by providing a lightweight aluminum paneled fence in which the aluminum panels are rigidly mounted to the terminal and line posts and then tensioned by a plurality of interwoven "floating" posts, increasing the panel rigidity while greatly reducing construction time. The invention includes a staggered panel relationship with adjacent horizontal panels being affixed vertically on opposite lateral sides of the line and terminal posts. The tensioning means also provides for air spaces allowing for air flow between the adjacent panels.

BRIEF DESCRIPTION OF THE INVENTION

A lightweight metal paneled fence comprising at least two vertically disposed fence posts anchored in the ground, a plurality of relatively thin elongated panels coupled between said posts, adjacent panels being coupled alternately to opposite lateral sides of said posts, a panel tensioning bar, said tensioning bar having a rectangular lateral cross-sectional shape, said tensioning bar being vertically disposed and alternately interlaced between adjacent panels, said tensioning bar being positioned so that the longer lateral side separates adjacent panels. The invention also includes the method of tensioning sheet metal panels between fence posts which includes the step of inserting a tensioning bar having an elongated lateral cross-sectional shape which allows for the tensioning bar to be inserted between panels with its shorter width and then rotated to its longer width, which acts to properly tension the panels between the fixed posts. The tensioning bar need not be anchored in the earth and can be termed as "floating".

It is an object of this invention to provide an improved lightweight sheet metal fence which may be easily constructed, reducing the fabrication costs and which provides an improved tensioning means to allow the panels to be tensely stretched between terminal and line posts.

It is another object of this invention to provide an improved aluminum paneled fence which is properly tensioned and yet provides spacing for air flow through the fence.

And yet still another object of this invention is to provide a method of constructing a lightweight, metal paneled fence of aluminum or the like which reduces construction time and results in a stronger fence structure.

And yet still another object of this invention is to provide a lightweight paneled fence utilizing a floating tensioning means to provide additional lateral and vertical support, the fence having an over-centered tensioning bar positional between adjacent flexible panels.

But still yet another object of this invention is to provide a metal panel fence utilizing continuous metal panels of any desired length.

In accordance with these and other objects which will be apparent hereinafter, the instant invention will now be described with particular reference to the accompanying drawings.

BRIEF DESCRIPTION OF THE DRAWINGS

FIG. 1 shows a front elevational view of a fence constructed in accordance with the instant invention.

FIG. 2 shows a top plan view of a fence constructed in accordance with the instant invention.

FIG. 3 shows a top plan view of the instant invention with the addition of a top rail.

FIG. 4 shows a side elevational view of the end post structure of the fence in accordance with the instant invention.

FIGS. 5 and 5A show top plan fragmentary views of the instant invention before and after tensioning respectively.

PREFERRED EMBODIMENT OF THE INVENTION

Referring now to the drawings, and specifically FIG. 1, Applicant's fence is shown generally at 10 comprised of a plurality of rigid vertical terminal posts 14 mounted in the earth in a concrete support foundation 22. The terminal posts are hollow and square in lateral cross-section. A line post 16 which is likewise anchored in the ground is disposed between terminal posts. The particular distance between the terminal posts is dependent only on the length of fence desired. A plurality of slat-like metal panels 12 and 20 are connected at opposite ends to the terminal posts by rivets or other conventional fastening means. The panels and posts are preferably made of aluminum having a protective anodized or enameled coating. Adjacent panels 12 and 20 engage the opposite lateral faces of posts 14 and 16 with the free ends of all panels wrapped partially about the posts and fastened by rivets on the outward facing post surface. Thus adjacent panels are laterally separated by a distance equal to the post thickness. The panels are also riveted to the front or rear surface of the line post 16. The vertical separation between adjacent panels may be as desired but should be sufficient to allow for the lateral displacement of adjacent panels. The vertical separation distance may be quite small so that the fence panels effectively obstruct visual observation of the opposite side of the fence. Tensioning bars 18 having, in the preferred embodiment, rectangular lateral cross-sections are suspended vertically in an interwoven manner between adjacent panels, the longer width of the bar separating the panels. The tensioning bars 18 need not be anchored in the ground in that they are supported by the panel tension, and thus may be termed "floating posts". The tensioning bars 18 are inserted after the panels have been riveted to the terminal and line posts. Each tensioning bar 18 is inserted between the panels along its narrower width. The tensioning bar 18 is then rotated 90° so that its longer width separates and is in contact with the adjacent panels, thus providing tension which removes any slack in each panel between terminal or line posts. The tensioning bars may then be riveted to the panels. The lateral separation between panels (shown in FIG. 2) thus allows for air flow through the fence. FIG. 2 shows how the adjacent panels are vertically staggered in an interwoven pattern by the tension bars.

FIG. 5 shows the tensioning bar 18 interwoven vertically along its narrower sides between adjacent horizontal panels 12 and 20. FIG. 5A shows the tensioning bar 18 after it has been rotated 90° to provide maximum tensioning of the fence panels 12 and 20.

To further anchor the terminal and line post of the fence, the posts, which are anchored in a concrete base 22, may have a plurality of holes in them to receive fluent concrete into the hollow interior of each post before it hardens to further anchor the posts in the ground. The invention has been constructed by Applicant using 100 foot continuous lengths of aluminum panels.

For additional support and stability, a split top rail 22 (FIG. 3) may be placed on the upper vertical ends of the fence terminal and line posts. The fence may be constructed in lengths as desired and the particular number of center and terminal supporting posts and the distance therebetween may be determined at the discretion of the fabricator.

The instant invention has been shown and described herein in what is considered to be the most practical and preferred embodiment. It is recognized, however, that departures may be made therefrom within the scope of the invention and that obvious modifications will occur to a person skilled in the art.

I claim:

1. The method of constructing a light weight sheet metal fence comprising the steps of:
   (a) fastening alternate panels, at least three, on opposite sides of spaced posts;
   (b) inserting the relatively narrower width of a tensioning bar having a cross-sectional shape including a longer width and a relatively narrower width between opposite sides of adjacent panels; and
   (c) rotating the bar once inserted to dispose the longer width between opposite sides of adjacent panels to add more tension to the panels.

* * * * *